United States Patent
Mukherji et al.

(10) Patent No.: US 6,694,008 B1
(45) Date of Patent: Feb. 17, 2004

(54) MONITORED SUSPENSION OF COMMUNICATIONS SESSIONS

(75) Inventors: Arijit Mukherji, Sunnyvale, CA (US); Gerardo Chaves, San Jose, CA (US); Christopher A. White, Saratoga, CA (US)

(73) Assignee: Cisco Technology, Inc., San Jose, CA (US)

( * ) Notice: Subject to any disclaimer, the term of this patent is extended or adjusted under 35 U.S.C. 154(b) by 481 days.

(21) Appl. No.: 09/603,127

(22) Filed: Jun. 23, 2000

(51) Int. Cl.[7] ............................................. H04M 7/00
(52) U.S. Cl. ................................. 379/228; 379/215.01
(58) Field of Search .............................. 379/228, 215.01

(56) References Cited

U.S. PATENT DOCUMENTS

| | | | |
|---|---|---|---|
| 5,436,967 A | 7/1995 | Hanson | 379/266 |
| 5,920,616 A | 7/1999 | Hazenfield | 379/162 |
| 6,002,760 A * | 12/1999 | Gisby | 379/266.01 |
| 6,031,905 A * | 2/2000 | Furman et al. | 379/215.01 |
| 6,049,603 A | 4/2000 | Schwartz et al. | 379/309 |
| 6,118,861 A * | 9/2000 | Gutzmann et al. | 379/201.01 |
| 6,122,346 A * | 9/2000 | Grossman | 379/68 |
| 6,141,328 A * | 10/2000 | Nabkel et al. | 370/259 |
| 6,188,751 B1 * | 2/2001 | Scherer | 379/88.22 |
| 6,301,354 B1 * | 10/2001 | Walker et al. | 379/266.01 |
| 6,377,668 B1 | 4/2002 | Smock et al. | 379/142.08 |
| 6,400,804 B1 * | 6/2002 | Bilder | 379/76 |
| 6,430,280 B1 | 8/2002 | Suisaka | 379/162 |

* cited by examiner

Primary Examiner—Ahmad F. Matar
Assistant Examiner—Rasha S. Al-Aubaidi
(74) Attorney, Agent, or Firm—Baker Botts L.L.P.

(57) ABSTRACT

A communications apparatus establishes a communications session with a remote location and receives a request to place the communications session into monitored suspension. While in monitored suspension, the apparatus maintains the communications session, periodically communicates a prompt to the remote location, and monitors the session to detect an appropriate response from the remote location. When an appropriate response is received from the remote location, the apparatus signals the user and allows the communications session to proceed with normal processing.

26 Claims, 3 Drawing Sheets

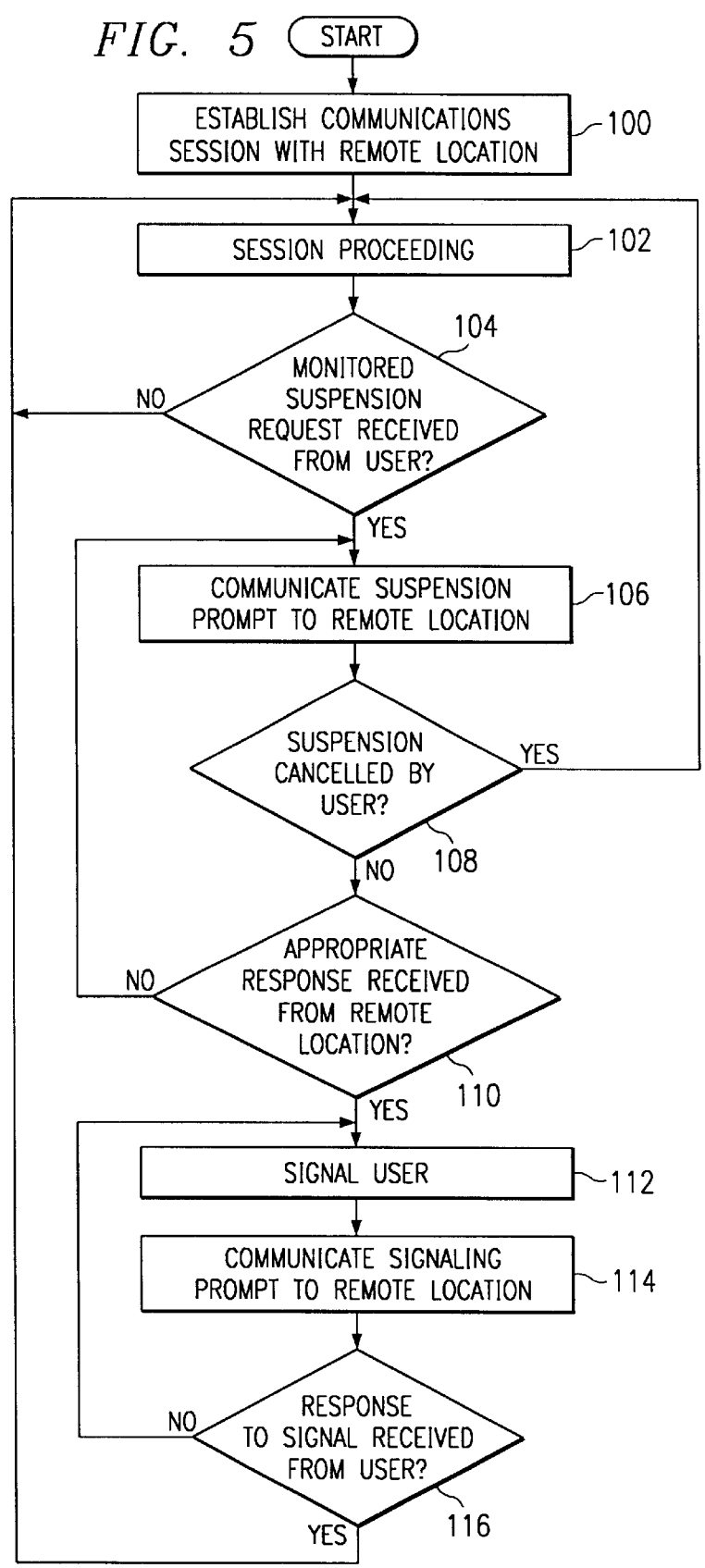

MONITORED SUSPENSION OF COMMUNICATIONS SESSIONS

TECHNICAL FIELD OF THE INVENTION

The present invention relates generally to communications systems and more particularly to monitored suspension of communications sessions.

BACKGROUND OF THE INVENTION

Telephone calls to large organizations often present callers with an annoying dilemma: to wait on hold until a live operator is available or to hang up and try again later. Many organizations, both large and small, use automatic call distribution systems that keep callers on hold until a live operator becomes available. To provide a more bearable wait, these systems may play music, provide estimates as to the time until a live operator will be available, or present other information to the caller on hold. Unfortunately, callers have little to no control over the features that will be offered. Therefore, callers must often resort to wasting time and concentration while waiting to connect with a live operator.

SUMMARY OF THE INVENTION

In accordance with the present invention, monitored suspension of a communications session is provided which substantially eliminates or reduces disadvantages and problems associated with previous systems and methods. In a particular embodiment, the present invention satisfies a need for a user-controlled device that monitors a communications session and signals the user when an appropriate response is received from another participant in the session.

According to one embodiment of the present invention, an activity suspension device for telephony communications includes an activator that receives a monitored suspension request and a line interface module that maintains a preestablished telephony communications session with a remote location and communicates a prompt to the remote location in response to the monitored suspension request. The device also includes a controller that detects a response from the remote location, the response indicating availability of a live operator at the remote location. In addition, the device includes a signaling module that signals a user that the response has been received.

In accordance with another embodiment of the present invention, a method for communicating with a remote location receives a monitored suspension request from a user, maintains a preestablished telephony communications session with a remote location, and communicates a prompt to the remote location in response to the monitored suspension request. The method also detects a response from the remote location, the response indicating availability of a live operator at the remote location, and signals the user that the response has been received.

The invention provides a number of technical advantages. Using these techniques, a caller may more effectively manage time while waiting to connect with a live operator. Because a caller does not have to constantly monitor the call to wait for a live agent, the caller is free to focus concentration on other tasks. Also, using a second communications channel, the caller can establish a second communications session without fear that the first session will be lost when a live agent picks up and the caller is unable to immediately respond.

For example, when a caller determines that he is waiting for a live operator, he may place the call into monitored suspension, and, using a second line, place a second telephone call. When the live operator picks up and responds to the prompts of the monitored suspension device, the caller is notified to switch back to the first telephone call. In addition, a caller may request that a suspended call be forwarded to another destination when the suspension device determines that a live operator is available. For example, a caller may place a session into monitored suspension and request that the suspension device forward the call to a mobile phone when a live operator is available. Other technical advantages of the present invention will be readily available to one skilled in the art from the following figures, descriptions, and claims.

BRIEF DESCRIPTION OF THE DRAWINGS

For a more complete understanding of the present invention and its advantages, reference is now made to the following descriptions, taken in conjunction with the accompanying drawings, in which:

FIG. 5 is a flowchart illustrating a method for monitored suspension of a communications session.

DETAILED DESCRIPTION OF THE INVENTION

Figure 1:
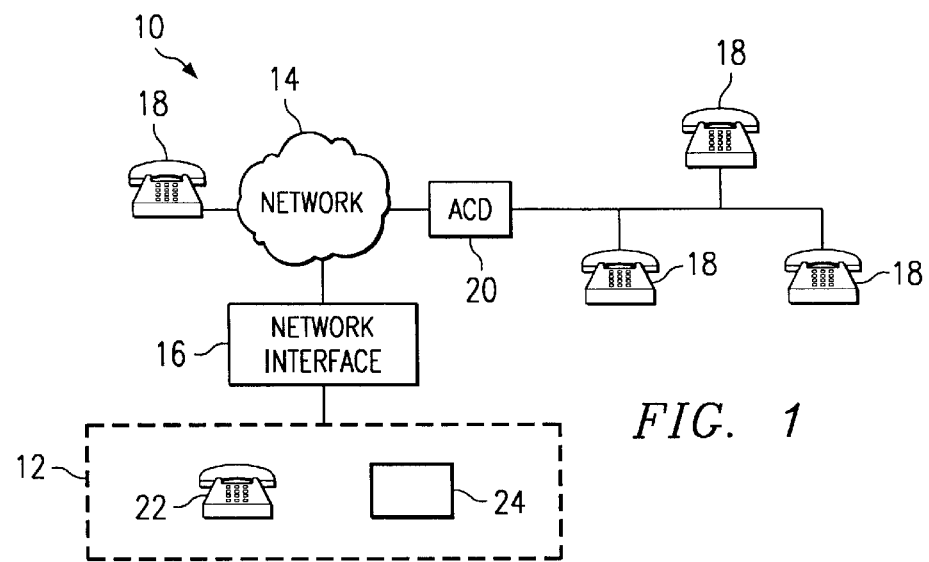
FIG. 1 illustrates a communications system including a device for monitored suspension of a communications session.

FIG. 1 illustrates a communications system, indicated generally at 10, that includes a communications/suspension apparatus 12 coupled to a network 14 via a network interface 16. In addition, system 10 includes a communications device 18 and an automatic call distributor (ACD) 20 each coupled to network 14. ACD 20 also connects a number of communications devices 18 to network 14. Apparatus 12 includes a communications module 22 and a suspension module 24. In general, apparatus 12 establishes a communications session with a remote communications device 18 using communications module 22 and may, responsive to a user request, suspend the session using suspension module 24. While the session is suspended, suspension module 24 periodically communicates a prompt to remote device 18 participating in the session until an appropriate response is detected. Upon detecting the response, suspension module 24 signals the user, thus providing an automatic notification when remote device 18 communicates an appropriate response.

Communications devices 18 represent hardware and/or software coupled to network 14 and capable of participating in communications using any suitable wireless or wireline protocol. For example, communications devices 18 may be analog telephones, computers running communications software, Internet protocol (IP) telephones, mobile units, or other suitable communications equipment. Moreover, each device 18 within system 10 may represent a separate type of equipment. For example, devices 18 coupled to ACD 20 may be different types of communications equipment than device 18 coupled directly to network 14. Moreover, devices 18 may support one or more types of communications, such as voice, video, and data.

ACD 20 represents hardware and/or software that receives or initiates communications sessions and maintains these sessions in a waiting state until one of the attached communications devices 18 becomes available. For example, live operators may use communications devices 18 coupled to ACD 20. ACD 20 receives calls and determines whether any of the operators are available. If not, the call is placed into a waiting state until an operator becomes available. In this waiting state, ACD 20 may communicate with the caller, for example, playing music or presenting other information in order to maintain the caller's attention.

Within system 10, communications session take place via network 14. Network 14 represents any collection and arrangement of hardware and/or software that communicates information between multiple devices. For example, network 14 may be one or a collection of components associated with the public switched telephone network (PSTN), local area networks (LANs), wide area networks (WANs), a global computer network such as the Internet, or any other communications equipment suitable for providing wireless and/or wireline communications.

In operation, communications/suspension apparatus 12 establishes a communications session with a remote location using communications module 22. Apparatus 12 uses network 14 to communicate with the remote equipment, connecting to network 14 using network interface 16. Network interface 16 represents any suitable hardware and/or software coupling apparatus 12 and network 14. For example, network interface 16 may be a telephone jack, a router, a modem, a network interface card (NIC), or any other suitable wireless or wireline link to network 14.

At any point during a communications session, a user of apparatus 12 may activate suspension module 24. Once activated, suspension module 24 maintains the preestablished communications session and begins periodically communicating a prompt to the remote location. This prompt signals the remote location to communicate a specific response to indicate availability. This prompt may be intended for an automated response generated by the remote equipment or for a specific response from a live operator at the remote location. For example, the prompt may state, "This call has been placed on hold while awaiting your availability, please press one to signal when you are available." Suspension module 24 periodically repeats the prompt until an appropriate response is received, the communications session is disconnected, or the user cancels the monitored suspension.

The prompt communicated to the remote location may contain any information designed to elicit an appropriate response. If the remote location is enhanced to coordinate with suspension module 24, suitable signaling techniques may be used to efficiently coordinate connections between live participants at either end of a communications session. For example, if ACD 20 is enhanced to operate with suspension module 24, ACD 20 may automatically generate an appropriate response to suspension module 24 immediately before connecting the communications session to a live operator of an attached communications device 18.

Moreover, ACD 20 may queue incoming calls and establish an order for connecting these calls to live operators. If ACD 20 determines that an incoming call is in monitored suspension, ACD 20 may adjust the queuing order. For example, a caller may wait longer for a live agent while in monitored suspension. Thus, ACD 20 may queue these calls for longer. Alternatively, a call in monitored suspension may be more likely to be a valid session, or apparatus 12 may provide information while in suspension to expedite processing when a live operator becomes available. Therefore, ACD may move these calls up in the queuing order. System 10 contemplates ACD 20 using any suitable technique for queuing and distributing calls to live operators based in part on information received from apparatus 12. However, the remote equipment participating in a session need not be specifically designed to operate with apparatus 12.

Upon receiving an appropriate response from the remote location, suspension module 24 signals the user that the communications session has been or soon will be connected to a live operator. Suspension module 24 signals the user using any appropriate technique, for example, by generating an audio or visual notification. While signaling the user, suspension module 24 may also periodically communicate a second prompt to the remote location. For example, suspension module 24 may communicate a message stating, "Signaling your availability, please hold." System 10 contemplates suspension module 24 using any appropriate prompt to notify the remote location that the user is being signaled. At this point, the user may rejoin the communications session to speak with the live operator.

To provide a user greater freedom while awaiting a live operator, suspension module 24 may be configured to signal a separate device or location when an appropriate response is received from remote device 18. Through any appropriate method, a user may specify a forwarding location for suspension module 24 to notify when an appropriate response is received from the remote location. For example, a user may specify a telephone number as the forwarding location, and, upon receiving an appropriate response from the remote location, suspension module 24 transfers, forwards, or otherwise connects the communications session to the remote location. Thus, the user may initiate a communications session using apparatus 12 and then specify a second location, such as a mobile phone, to connect with the communications session when a live operator becomes available.

In a particular embodiment, apparatus 12 supports multiple communications sessions with remote locations. For example, apparatus 12 may be a telephone with multiple lines. With communications module 22, a user may establish a first communications session with a first remote location and place that session into monitored suspension using suspension module 24. Then the user may establish a second communications session with a second location. Suspension module 24 maintains and monitors the first communications session to detect when an appropriate response is received from the first remote location. When the appropriate response is received, suspension module 24 may signal the user using any appropriate technique.

For example, using a telephone with multiple lines, a user may place a telephone call to a first remote location using one line, determine that the call is holding for attention by a live operator, and then place the call into monitored suspension by activating suspension module 24. The user may then place a second telephone call to a second remote location using a different line. When suspension module 24 detects an appropriate response from the first remote location, it signals the user using any appropriate audio or visual indication. The user may then switch back to the first call maintained by suspension module 24 on the first line.

Figure 2A:
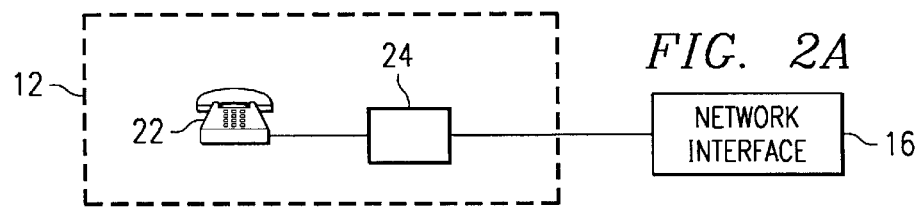
FIGS. 2A, 2B, and 2C are block diagrams illustrating various configurations for coupling the suspension device to the communications system.
Figure 2B:
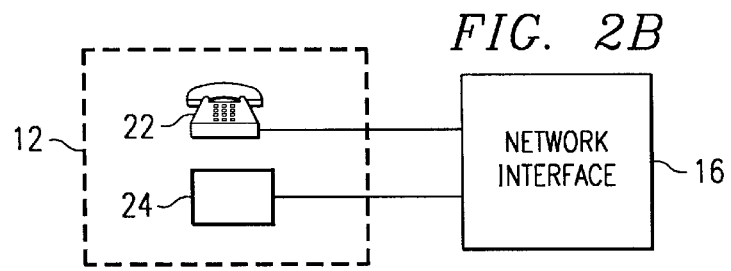
Figure 2C:
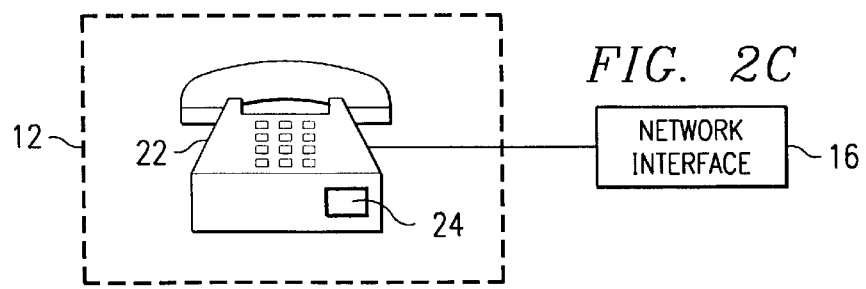

FIGS. 2A, 2B, and 2C illustrate various configurations of communications module 22 and suspension module 24 within apparatus 12. These examples illustrate functional and/or physical configurations implemented in hardware and/or software for communications module 22 and suspension module 24. In the first example, suspension module 24 is located inline between communications module 22 and network interface 16. For example, communications module 22 may be a telephone and network interface 16 may be a telephone wall jack. Suspension module 24, installed inline between the telephone and the wall jack, allows the user to suspend telephone calls made with communications module 22. Thus, as previously discussed, the user may place calls made with communications module 22 into monitored suspension and then perform other tasks until signaled by suspension module 24.

In the second example, communications module 22 and suspension module 24 are coupled in parallel to network interface 16. This provides an alternate arrangement for separating the communications and suspension functionalities either physically or functionally within communications/suspension apparatus 12. For example, communications module 22 may be a telephone while suspension module 24 is a device that provides for monitored suspension of telephone calls placed by communications module 22. Alternatively, communications module 22 and suspension module 24 may be software applications executing on a computer. By providing a separate component for suspension module 24, the monitored suspension functionality may be added to communications equipment with little to no modifications to the existing hardware or software. Therefore, whether connected in serial or parallel, suspension module 24 may provide enhanced capabilities for communications module 22.

In the third example, suspension module 24 provides embedded functionality within communications module 22. Thus, the functionalities of suspension module 24 may be implemented within the same software or device providing the functionalities of communications module 22. For example, communications module 22 may be communications software that also provides the functionalities of suspension module 24. However, this example represents any suitable hardware and/or software providing combined capabilities of communications module 22 and suspension module 24. These three examples illustrate only specific embodiments for providing communications services using communications module 22 and monitored suspension of communications sessions using suspension module 24. System 10 contemplates any suitable combination or separation of the functionalities of communications module 22 and suspension module 24 using any appropriate combination and arrangement of hardware and/or software.

Figure 3:
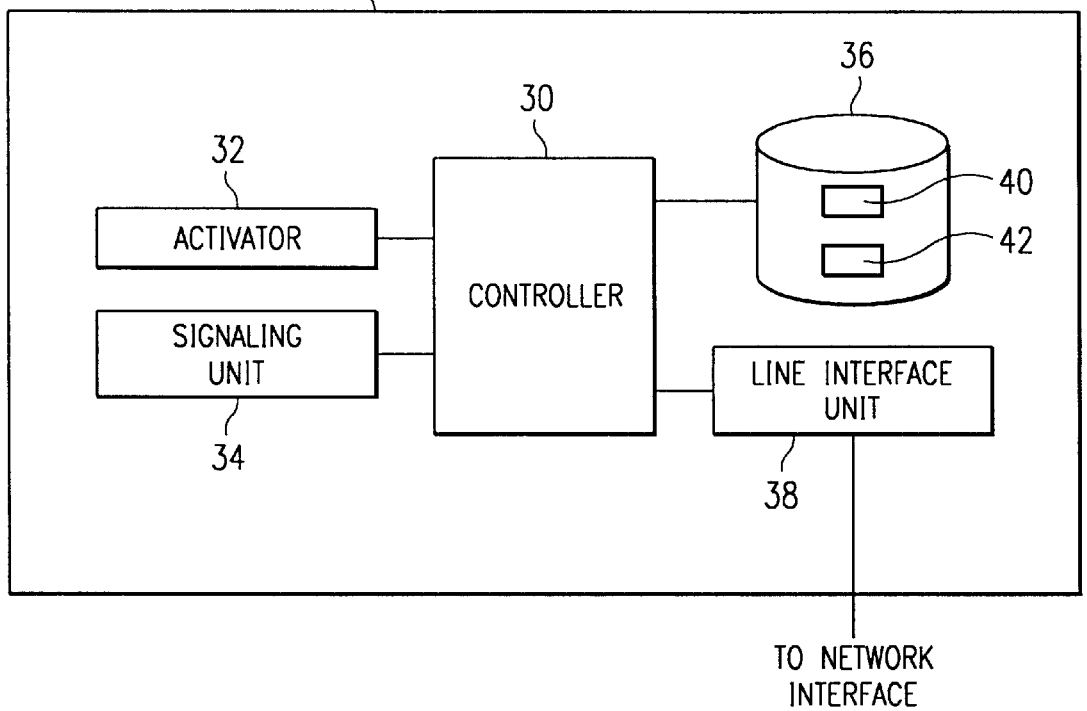
FIG. 3 is a block diagram illustrating functional components of an exemplary suspension device.

FIG. 3 illustrates the functional components of an exemplary suspension module 24, including a controller 30 coupled to an activator 32, a signaling unit 34, a memory 36, and a line interface unit 38. In general, controller 30 receives a request to place a communications session into monitored suspension from activator 32. While in monitored suspension, controller 30 periodically communicates a suspension prompt 40 to a remote location using line interface unit 38, detects an appropriate response from the remote location received by line interface unit 38, and signals the user that the appropriate response has been received using signaling unit 34.

Activator 32 provides an interface to suspension module 24, allowing a user to place a communications session into monitored suspension by signaling a monitored suspension request. For example, activator 32 may be a button, a dual tone multi-frequency (DTMF) detector, a voice recognition unit, a graphical user interface (GUI), or any other suitable interface for receiving a request from a user. Signaling unit 34 provides an interface for communicating information to a user. For example, signaling unit 34 may be a speaker, the earpiece of a telephone, a light emitting diode (LED), a graphical user interface, a twisted pair telephone line adapter, or any other suitable interface for communicating information to a user. Moreover, signaling unit 34 may provide multiple interfaces for communicating information to a user.

For example, if suspension module 24 represents a device that may be installed inline between communications module 22 and network interface 16, signaling unit 34 may include a twisted pair telephone line adapter, a speaker, and a visual indicator such as an LED. When an appropriate response is detected from a remote location, controller 30 may generate an audio indication and a visual indication using signaling unit 34 and signal a call to communications module 22 using the twisted pair telephone line adapter portion of signaling unit 34. This illustrates only a specific example for the operation of suspension module 24 in communicating information to a user. System 10 contemplates suspension module 24 using any suitable techniques for communicating information, such as signals, to a user.

Memory 36 represents any one or a combination of volatile or non-volatile, local or remote devices suitable for storing data, for example, random access memory (RAM) devices, read only memory (ROM) devices, magnetic storage devices, optical storage devices, or any other suitable data storage devices. Memory 36 may store suspension prompt 40, a signaling prompt 42, and any other suitable data. Suspension prompt 40 represents any data that may aid in communicating with a remote location during monitored suspension of a communications session. For example, suspension prompt 40 may be a message periodically communicated to the remote location to indicate that a communications session has been placed in monitored suspension and to request an appropriate response from the remote location.

When an appropriate response has been received, suspension module 24 may switch from communicating suspension prompt 40 to periodically communicating signaling prompt 42 to the remote location. Signaling prompt 42 may indicate that suspension module 24 is notifying the user that the appropriate response has been received. Therefore, suspension prompt 40 attempts to elicit an appropriate response from a remote participant, while signaling prompt 42 provides feedback to the remote participant after an appropriate response has been received. In addition to these prompts, memory 36 may store other data for use by apparatus 12 or other devices in system 10. For example, memory 36 may store a forwarding location, configured as discussed above, indicating a location to contact when suspension module 24 detects an appropriate response from a remote location.

Line interface unit 38 couples to network 14 via network interface 16 and allows suspension module 24 to communicate information to remote locations and detect communications received from remote locations. For example, line interface unit 38 may be a telephone line interface, a modem, a network interface card (NIC), a software interface module, or other suitable wireless or wireline interface between suspension module 24 and other communications equipment.

In operation, a user establishes a communications session with a remote location and then places the session into monitored suspension by activating suspension module 24 using activator 32. While in suspension, controller 30 periodically communicates suspension prompt 40 to the remote location using line interface 38. During this time, suspension module 24 frees the user to perform other tasks. For example, the user may establish other communications sessions using communications module 22. Upon detecting an appropriate response from the remote location, controller 30 signals the user using signaling unit 34 and communicates signaling prompt 42 to the remote location. The user may then rejoin the session using communications module 22. Alternatively, suspension module 24 may forward, transfer, or otherwise connect the session to a forwarding location specified by the user when an appropriate response is received.

While this example illustrates specific functional modules for suspension module 24, system 10 contemplates implementing the techniques described using any suitable combination and arrangement of hardware and/or software. In addition, functionalities from each of these modules and those from communications module 22 may be combined or separated into smaller or larger functional units when appropriate, and any of the methods or functionalities described may be implemented by a computer program stored on a computer readable medium.

Figure 4:
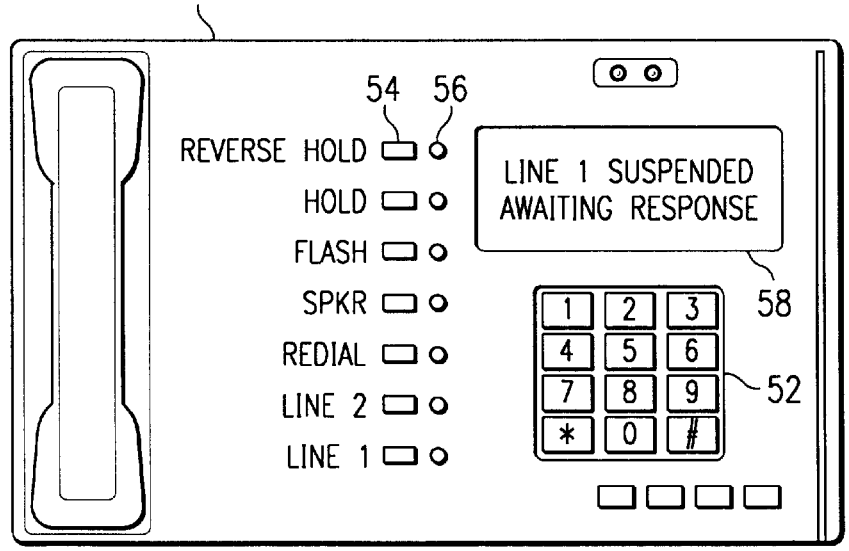
FIG. 4 illustrates an exemplary interface for a device having monitored suspension capabilities.

FIG. 4 illustrates an exemplary user interface 50 that allows a user to interact with communications module 22 and suspension module 24. Using a keypad 52, a user may interface with communications module 22 to initiate a communications session with a remote location. Once a communications session is established, the user may place the session into monitored suspension using a reverse hold button 54 (a specific embodiment of activator 32) to activate suspension module 24. Communications module 22 and suspension module 24 may use an indicator 56 and/or a display 58 to indicate the current state of communications sessions established by apparatus 12.

In this example, display 58 indicates that a communications session established on line #1 is currently suspended and is awaiting an appropriate response from the remote location. When an appropriate response is detected, suspension module 24 may use display 58, indicator 56, or any other appropriate interface to signal the user that an appropriate response has been detected. Thus, indicator 56 and display 58 represent specific examples for components of signaling unit 34.

Interface 50 illustrates only a specific example for an interface between a user and communications module 22 and signaling module 24. Apparatus 12 may implement interface 50 using any suitable combination of hardware and/or software, such as a graphical user interface, a telephone keypad, or any other appropriate interface. Moreover, while this example illustrates a unified interface for both communications module 22 and suspension module 24, system 10 contemplates any appropriate combination or separation of interfaces to these modules.

FIG. 5 is a flowchart illustrating a method for monitored suspension of a communications session. A user establishes a communications session with a remote location using communications module 22 at step 100. This session transports voice, data, video, signals, or other appropriate information between apparatus 12 and the remote location. Communications module 22 proceeds with normal processing of the communications session at step 102. Suspension module 24 determines whether a monitored suspension request has been received from the user at step 104. For example, the user may request monitored suspension of the session using activator 32. If no request has been received, the communications session proceeds normally at step 102.

However, if a monitored suspension request has been received, suspension module 24 ensures that the communications session remains active while communicating suspension prompt 40 to the remote location at step 106. For example, at this point, the user may "hang up" communications module 22 without disconnecting the communications session. Moreover, communications module 22 may be used to establish a second communications session with a second remote location while suspension module 24 provides monitored suspension of the first communications session.

Suspension module 24 determines whether the monitored suspension has been canceled by the user at step 108. If canceled, the session returns to normal processing by communications module 22 at step 102. If the suspension has not been canceled, suspension module 24 determines whether an appropriate response has been received from the remote location at step 110. If not, suspension module 24 communicates suspension prompt 40 to the remote location again at step 106. System 10 contemplates suspension module 24 detecting any suitable response from the remote location. For example, this may be a voice response, a DTMF signal, or suspension module 24 may anticipate a connection based on sounds received from the remote location. However, suspension modules 24 and the remote location may use any suitable techniques to signal an appropriate response.

If an appropriate response is received from the remote location at step 110, suspension module 24 signals the user using signaling unit 34 at step 112. To signal the user, suspension module 24 may determine that a forwarding location has been specified and then forward or transfer the session to the forwarding location. However, suspension module 24 may use any suitable method for alerting the user that an appropriate response has been received from the remote location. In addition, while signaling the user, suspension module 24 may communicate signaling prompt 42 to the remote location at step 114. This notifies the remote location that the appropriate response has been detected and that the user is being signaled.

Suspension module 24 determines whether the user has responded to the signal at step 116. This response represents any suitable condition indicating that the user is prepared to participate in the session. Suspension module 24 may use any appropriate technique to determine when to stop signaling the user. For example, suspension module 24 may detect when the user picks up the telephone handset to rejoin the communications session or may require the user to press a button to disable suspension module 24. However, suspension module 24 may use any suitable technique for determining when the user is prepared to participate in the communications session.

While this flowchart illustrates an exemplary method, system 10 contemplates using any suitable techniques for monitored suspension of communications sessions with remote locations. Also, many of the steps in this flowchart may take place simultaneously and/or in different orders than as shown. Furthermore, system 10 contemplates using methods with additional steps, fewer steps, or different steps, so long as the methods remain appropriate for monitored suspension of a communications session with a remote location.

Although the present invention has been described in several embodiments, a myriad of changes and modifications may be suggested to one skilled in the art, and it is intended that the present invention encompass such changes and modifications as fall within the scope of the present appended claims.

What is claimed is:

1. An activity suspension module for telephony communications comprising:
    an activator operable to receive a monitored suspension request from a user of the activity suspension module;
    a line interface module operable to maintain a preestablished telephony communications session with a remote location and to communicate a prompt to the remote location in response to the monitored suspension request;
    a controller operable to detect a response from the remote location, wherein the response indicates availability of a live operator at the remote location, the controller further operable to determine a forwarding location specified by the user and direct the line interface module to connect the telephony communications session to the forwarding location after detecting the response from the remote location; and
    a signaling module operable to signal the user that the response has been received.

2. The activity suspension device of claim 1, wherein the forwarding location comprises a telephone number.

3. The activity suspension device of claim 1, wherein the line interface module is further operable to establish a second telephony communications session with a second remote location while maintaining the preestablished telephony communications session.

4. The activity suspension device of claim 1, wherein the activator is at least one of a button, a dual tone multi-frequency (DTMF) detector, a voice recognition module, and a graphical user interface.

5. The activity suspension device of claim 1, wherein the signaling module is at least one of a speaker, a telephone earpiece, a light emitting diode (LED), a graphical user interface, and a twisted pair telephone line adapter.

6. The activity suspension device of claim 1, wherein the prompt comprises a prerecorded message requesting a remote agent associated with the remote location to generate the response, and the line interface module is further operable to periodically communicate the prompt to the remote location.

7. The activity suspension device of claim 1, wherein the response is at least one of a dual tone multi-frequency (DTMF) signal and a voice command.

8. A method for suspending user participation in a communications session comprising:
    receiving a monitored suspension request from a user;
    maintaining a preestablished telephony communications session with a remote location;
    communicating a prompt to the remote location in response to the monitored suspension request;
    detecting a response from the remote location, wherein the response indicates availability of a live operator at the remote location;
    signaling the user that the response has been received;
    determining a forwarding location specified by the user; and
    connecting the telephony communications session to the forwarding location after detecting the response from the remote location.

9. The method of claim 8, wherein the forwarding location comprises a telephone number.

10. The method of claim 8, further comprising:
    establishing a second telephony communications session with a second remote location while maintaining the preestablished telephony communications session;
    switching from the second telephony communications session to the original telephony communications session after receiving the response from the original remote location.

11. The method of claim 8, wherein the response is at least one of a dual tone multi-frequency (DTMF) signal and a voice command.

12. The method of claim 8, wherein communicating the prompt to the remote location comprises periodically communicating a prerecorded message requesting a remote agent associated with the remote location to generate the response.

13. The method of claim 8, further comprising communicating a second prompt to the remote location after detecting the response, wherein the second prompt indicates that the user is being signaled.

14. Software for suspending user participation in a communications session, the software embodied on a computer readable medium and operable to:
    receive a monitored suspension request from a user;
    maintain a preestablished telephony communications session with a remote location;
    periodically communicate a prompt to the remote location in response to the monitored suspension request;
    detect a response from the remote location, wherein the response indicates availability of a live operator at the remote location;
    signal the user that the response has been received;
    determine a forwarding location specified by the user; and
    connect the telephony communications session to the forwarding location after detecting the response from the remote location.

15. The software of claim 14, wherein the forwarding location comprises a telephone number.

16. The software of claim 14, further operable to:
    establish a second telephony communications session with a second remote location while maintaining the preestablished telephony communications session;
    switch from the second telephony communications session to the original telephony communications session after receiving the response from the original remote location.

17. The software of claim 14, further operable to detect the response by detecting a dual tone multi-frequency (DTMF) signal from the remote location.

18. The software of claim 14, wherein the prompt comprises a prerecorded message requesting a remote agent associated with the remote location to generate the response.

19. The software of claim 14, further operable to communicate a second prompt to the remote location after detecting the response, wherein the second prompt indicates that the user is being signaled.

20. A telephony communications apparatus comprising:
    means for receiving a monitored suspension request from a user;
    means for maintaining a preestablished telephony communications session with a remote location;
    means for communicating a prompt to the remote location in response to the monitored suspension request;
    means for detecting a response from the remote location, wherein the response indicates availability of a live operator at the remote location;

means for signaling the user that the response has been received;

means for determining a forwarding location specified by the user; and means for connecting the telephony communications session to the forwarding location after detecting the response from the remote location.

21. The apparatus of claim 20, wherein the forwarding location comprises a telephone number.

22. The apparatus of claim 20, further comprising:

means for establishing a second telephony communications session with a second remote location;

means for switching from the second telephony communications session to the original telephony communications session after receiving the response from the original remote location.

23. The apparatus of claim 20, wherein the prompt comprises a prerecorded message requesting a remote agent associated with the remote location to generate the response.

24. The apparatus of claim 20, further comprising means for communicating a second prompt to the remote location after detecting the response, wherein the second prompt indicates that the user is being signaled.

25. A telephony communications system comprising:

an automatic call distributor operable to establish a telephony communications session with a remote communications apparatus, communicate information to the apparatus indicating that the session is awaiting a live agent, and queue a plurality of telephony communications sessions from a plurality of remote devices, wherein the queue comprises an order for assigning the sessions to available live agents, the automatic call distributor further operable to determine that the apparatus has received the monitored suspension request from the user, adjust the order for assigning the sessions based on the determination, determine that a selected one of a plurality of live agents is available, and connect the session to the available live agent; and the remote communications apparatus operable to receive a monitored suspension request from a user, maintain the session with the automatic call distributor, communicate a prompt to the automatic call distributor requesting a response, detect the response, and signal the user that the response has been received, wherein the response indicates that the live agent is available, wherein signaling the user that the response has been received comprises determining a forwarding location specified by the user and connecting the telephony communications session to the forwarding location after detecting the response from the automatic call distributor.

26. The communications system of claim 25, wherein the automatic call distributor is further operable to communicate the response to the apparatus prior to connecting the session to the available live operator.

* * * * *